(12) United States Patent
Ahn (10) Patent No.: US 10,156,997 B2
(45) Date of Patent: Dec. 18, 2018

(54) DATA STORAGE DEVICE AND OPERATING METHOD TO PERFORM WEAR LEVELING BASED ON ELAPSED TIME AND WRITE COUNT

(71) Applicant: SK hynix Inc., Gyeonggi-do (KR)

(72) Inventor: Soo Hong Ahn, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/456,741

(22) Filed: Mar. 13, 2017

(65) Prior Publication Data

US 2018/0107386 A1 Apr. 19, 2018

(30) Foreign Application Priority Data

Oct. 18, 2016 (KR) .................. 10-2016-0135191

(51) Int. Cl.
*G11C 16/34* (2006.01)
*G06F 3/06* (2006.01)

(52) U.S. Cl.
CPC .............. *G06F 3/061* (2013.01); *G06F 3/064* (2013.01); *G06F 3/0616* (2013.01); *G06F 3/0647* (2013.01); *G06F 3/0653* (2013.01); *G06F 3/0679* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 2015/0154111 A1* | 6/2015 | D'Abreu | ............ | G06F 12/0246 714/6.11 |
| 2017/0315737 A1* | 11/2017 | Kajigaya | ............... | G06F 3/0616 |
| 2017/0337127 A1* | 11/2017 | Sutardja | .............. | G06F 12/0246 |
| 2018/0004653 A1* | 1/2018 | Moon | ................. | G06F 12/0246 |

FOREIGN PATENT DOCUMENTS

KR  1020160011488  2/2016

* cited by examiner

*Primary Examiner* — Son Dinh
*Assistant Examiner* — Sultana Begum
(74) *Attorney, Agent, or Firm* — IP & T Group LLP (57) ABSTRACT

A data storage device includes a nonvolatile memory device including a memory region, the memory region including a plurality of memory units; and a controller suitable for monitoring an elapsed time and a write count of the memory region, and performing a wear leveling operation for at least one memory unit selected among the plurality of memory units depending on a monitoring result.

16 Claims, 6 Drawing Sheets

$$\text{Critical time (CT)} = \frac{\text{Drift time}}{\text{Number of entire memory units of memory region(n)}}$$

FIG.5

DATA STORAGE DEVICE AND OPERATING METHOD TO PERFORM WEAR LEVELING BASED ON ELAPSED TIME AND WRITE COUNT

CROSS-REFERENCES TO RELATED APPLICATION

The present application claims priority under 35 U.S.C. § 119(a) to Korean application number 10-2016-0135191, filed on Oct. 18, 2016 in the Korean Intellectual Property Office, which is incorporated herein by reference in its entirety.

BACKGROUND

1. Technical Field

Various embodiments generally relate to a data storage device, and, more particularly, to a data storage device including a nonvolatile memory device.

2. Related Art

Data storage devices may store data provided by an external device in response to a write request. Data storage devices may also provide stored data to an external device in response to a read request. Examples of external devices that use data storage devices include desktop, portable and mobile electronic devices including computers, digital cameras, cellular phones, smart phones, smart cards, and the like. Data storage devices may be embedded in an external device during manufacturing of the external devices or may be fabricated separately and then connected afterwards to an external device.

The data storage device may be prepared in the form of a Personal Computer Memory Card International Association (PCMCIA) card, a Compact Flash (CF) card, a smart media card, a memory stick, various multimedia cards (e.g., MMC, eMMC, RS-MMC, and MMC-Micro), various secure digital cards (e.g., SD, Mini-SD, and Micro-SD), a Universal Flash Storage (UFS), a Solid State Drive (SSD) and the like.

SUMMARY

In an embodiment, a data storage device may include: a nonvolatile memory device including a memory region, the memory region including a plurality of memory units; and a controller suitable for monitoring an elapsed time and a write count of the memory region, and performing a wear leveling operation for at least one memory unit selected among the plurality of memory units depending on a monitoring result.

In an embodiment, a method for operating a data storage device may include: monitoring an elapsed time and a write count of a memory region including a plurality of memory units; and performing a wear leveling operation for at least one memory unit selected among the plurality of memory units, depending on a monitoring result.

In an embodiment, a data storage device may include: a nonvolatile memory device including a memory region which includes a plurality of memory units; and a controller suitable for performing a wear leveling operation for the memory region with a cycle of a critical write count, wherein the controller performs the wear leveling operation at latest within a critical time, and wherein the critical time is set based on a drift time of the memory region.

In an embodiment, a method for operating a data storage device may include: determining a critical time based on a drift time of a memory region of a nonvolatile memory device, the memory region including a plurality of memory units; and performing a wear leveling operation for the memory region with a cycle of a critical write count, at latest within the critical time.

BRIEF DESCRIPTION OF THE DRAWINGS

The above and other features and advantages of the present invention will become more apparent to those skilled in the art to which the present invention belongs by describing various embodiments thereof with reference to the attached drawings in which.

DETAILED DESCRIPTION

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, b, and C.

The term "or" as used herein means either one of two (or more) alternatives but not both (nor any combinations thereof).

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

Figure 1:
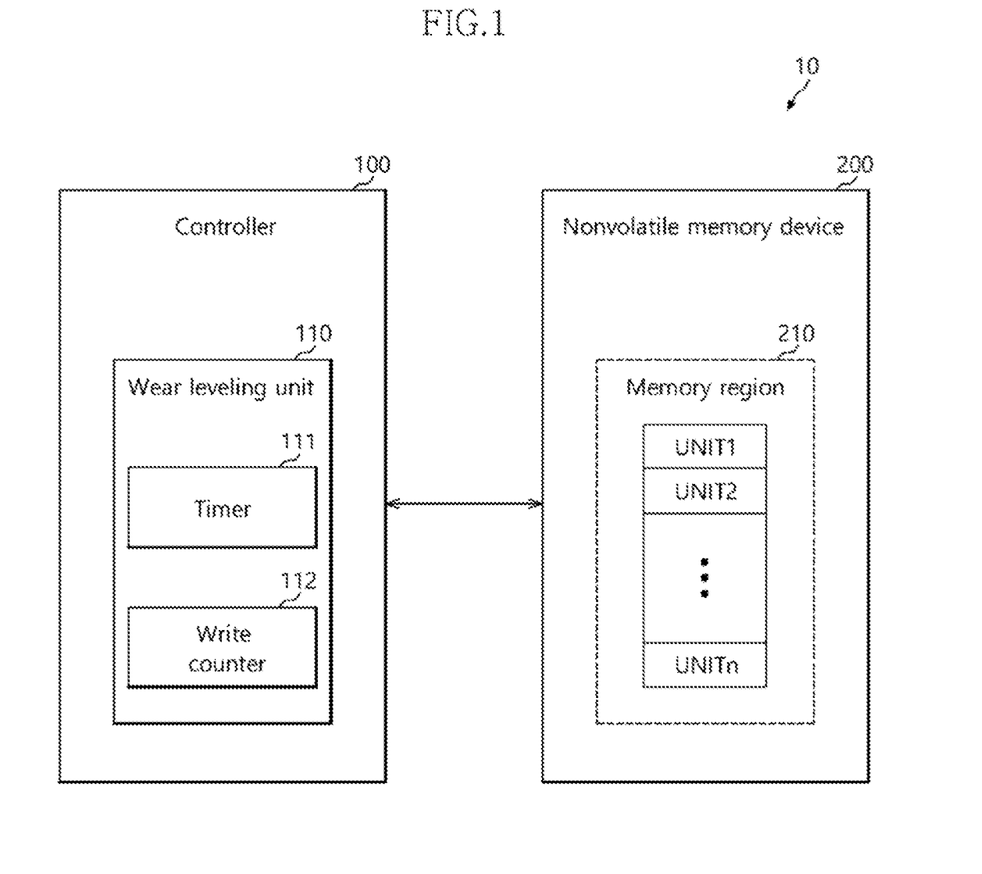
FIG. 1 is a block diagram illustrating a data storage device in accordance with an embodiment.

Referring now to FIG. 1, a data storage device 10 is provided, in accordance with an embodiment of the present invention.

The data storage device 10 may store data and output stored data to a host device (not shown), according to control of the host device. The data storage device 10 may be prepared in the form of a Personal Computer Memory Card International Association (PCMCIA) card, a Compact Flash (CF) card, a smart media card, a memory stick, various multimedia cards (e.g., MMC, eMMC, RS-MMC, and MMC-Micro), various secure digital cards (e.g., SD, Mini-SD, and Micro-SD), a Universal Flash Storage (UFS), a Solid State Drive (SSD) and the like.

The data storage device 10 may include a controller 100 and a nonvolatile memory device 200.

The controller 100 may store data in the nonvolatile memory device 200 and read the data stored in the nonvolatile memory device 200, according to control of the host device. Also, the controller 100 may perform by itself a management operation such as a wear leveling operation for extending the service lifetime of the nonvolatile memory device 200 and a refresh operation for retaining the data reliability of the nonvolatile memory device 200.

The controller 100 may include a wear leveling unit 110 which includes a timer 111 and a write counter 112. The timer 111 may measure time. The write counter 112 may count the number of write operations performed for a memory region 210 of the nonvolatile memory device 200 according to control of the host device, and generate a write count. The wear leveling unit 110 may perform a wear leveling operation for the memory region 210, when the time elapsed as measured by the timer 111 reaches a critical time or when the write count of the write counter 12 reaches a critical count. The elapsed time as measured by the timer 111 and the write count generated by the write counter 112 may be reset each time after the completion of a wear leveling operation. The wear leveling unit 110 may perform a wear leveling operation at the latest within the critical time.

In an embodiment, the critical time may be set based on the number of memory units UNIT1 to UNITn included in the memory region 210 and a drift time associated with occurrence of an error bit.

The wear leveling unit 110 may perform a wear leveling operation according to at least one of swap algorithm and a gap algorithm. As will be described later in detail with reference to FIGS. 4 and 5, the wear leveling operations may employ a swap algorithm or a gap algorithm, respectively. In yet another embodiment (not shown) the wear leveling operations may employ a combination of a swap algorithm and a gap algorithm. Memory units for which a wear leveling operation is to be performed in the memory region 210 may be selected sequentially. For example, memory units for which a wear leveling operation is to be performed in the memory region 210 may be selected sequentially based on their physical addresses. Moreover, memory units for which a wear leveling operation is to be performed in the memory region 210 may be selected evenly. The wear leveling operation is to be performed at the latest within the critical time, so that a refresh effect that prevents occurrence of an error bit may be induced for all the memory units in a memory region. This way, the controller 100 does not need to manage a separate refresh operation because the controller achieves a refresh effect through the wear leveling operations. Hence, the operational burden of the controller 100 is reduced and the performance of the controller 100 may also be improved.

The nonvolatile memory device 200 may store data according to control of the controller 100, and retain the data stored therein, even though power is not supplied from an exterior device. In the following descriptions, the nonvolatile memory device 200 may be a resistive random access memory (ReRAM). However, the embodiment of the present disclosure is not limited thereto, and the nonvolatile memory device 200 may be implemented by a flash memory, such as a NAND flash or a NOR flash, a Ferroelectrics Random Access Memory (FeRAM) a Phase-Change Random Access Memory (PCRAM), a Magnetoresistive Random Access Memory (MRAM), and the like.

The nonvolatile memory device 200 may include the memory region 210 for storing data. The memory region 210 may include the plurality of memory units UNIT1 to UNITn. Each of the plurality of memory units UNIT1 to UNITn may include a plurality of memory cells (not shown).

While the nonvolatile memory device 200 includes one memory region 210 in FIG. 1, it is to be noted that a plurality of memory regions 210 may be included. When a plurality of memory regions are employed, the timer 111 may measure an elapsed time separately for each of the plurality of memory regions 210, the write counter 112 may count a write count separately for each of the plurality of memory regions 210, and the wear leveling unit 110 may perform a wear leveling operation for each of the plurality of memory regions 210 based on an elapsed time and a write count corresponding thereto.

Figure 2A:
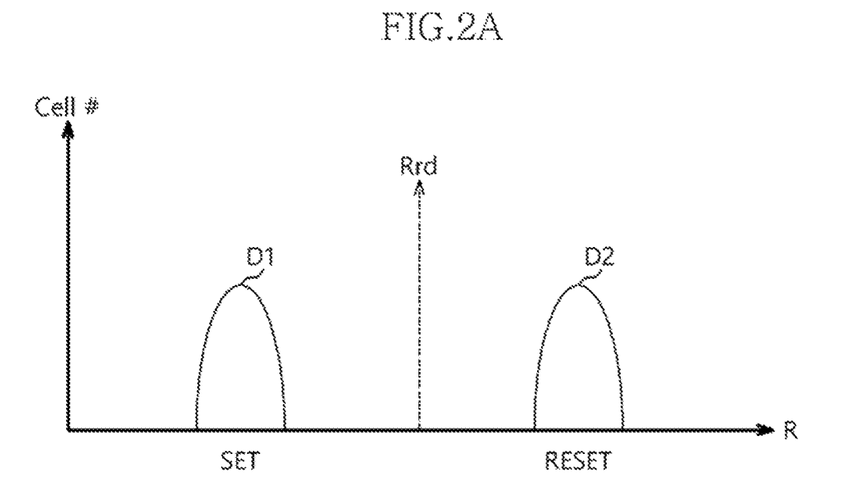
FIGS. 2A and 2B are diagrams to assist in the explanation of the drift phenomenon of the memory cells included in the memory region shown in FIG. 1.
Figure 2B:
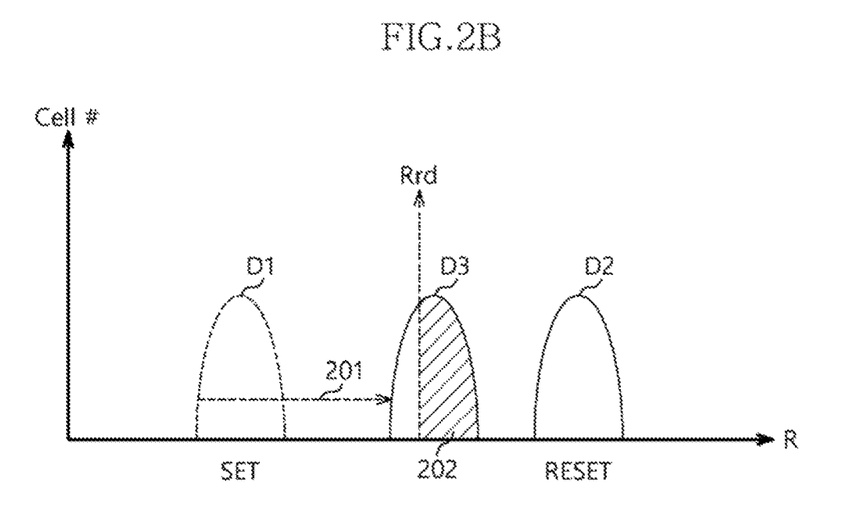

FIGS. 2A and 2B are diagrams to assist in the explanation of a drift phenomenon of the memory cells included in the memory region 210 shown in 1. In FIGS. 2A and 2B, a horizontal axis R represents the resistance value of a memory cell, and a vertical axis Cell # represents the number of memory cells.

First, each of the memory cells of the memory region 210 may exist in a set state (SET) or a reset state (RESET) depending on the data value stored therein through a write operation. The set state and the reset state may be identified by the resistance value of a memory cell. In other words, a memory cell which has a resistance value smaller than a read resistance value Rrd may exist in the set state, and a memory cell which has a resistance value larger than the read resistance value Rrd may exist in the reset state. In FIG. 2A, a state distribution D1 may include memory cells which are in the set state, and a state distribution D2 may include memory cells which are in the reset state.

A read operation for a memory cell may be performed by applying a predetermined current to the memory cell and comparing the amount of current passed through the memory cell with a reference current amount. The reference current amount may be an amount of current corresponding to the read resistance value Rrd, that is, the amount of current passed through a memory cell which has the read resistance value Rrd. Therefore, when the resistance value of a memory cell is smaller than the read resistance value Rrd, that is, when the amount of current passed through the memory cell is larger than the reference current amount, the memory cell may be determined to be in the set state, and data corresponding to the set state, that is, set data may be read. When the resistance value of a memory cell is larger than the read resistance value Rrd, that is, when the amount of current passed through the memory cell is smaller than the reference current amount, the memory cell may be determined to be in the reset state, and data corresponding to the reset state, that is, reset data may be read.

Referring to FIG. 2B, when a drift phenomenon 201 occurs in which the resistance values of memory cells increase as time passes, the state distribution D1 may move to a state distribution D3. At this time, if a read operation is performed based on the read resistance value Rrd, since reset data may be read from memory cells 202 in which set data are written, read errors may occur.

Figure 3:
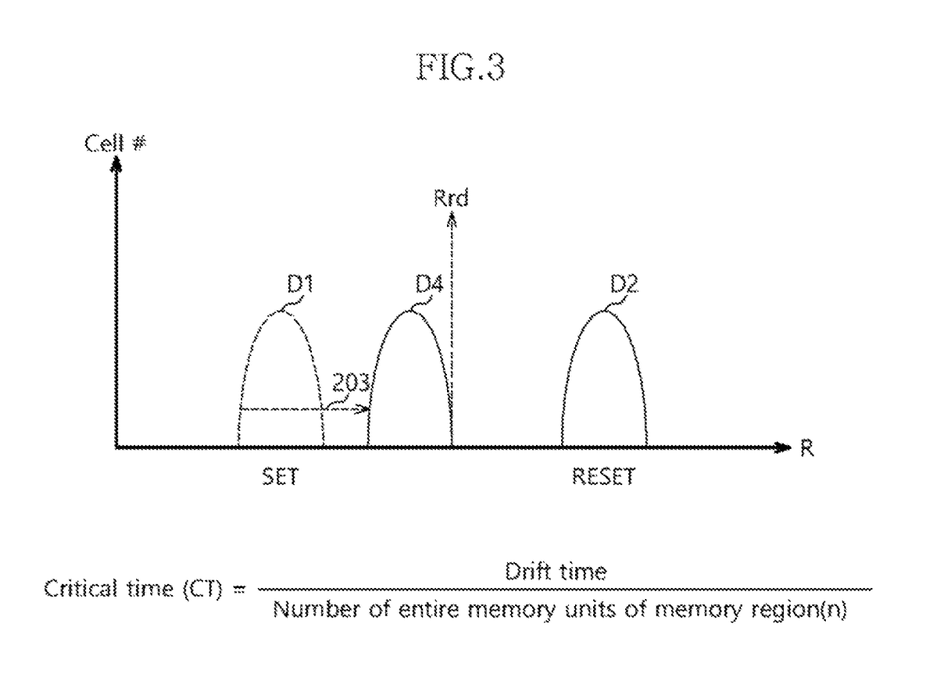
FIG. 3 is a diagram to assist in the explanation of a critical time for performing a wear leveling operation in the embodiment.

FIG. 3 is a diagram to assist in the explanation of a critical time for performing a wear leveling operation in the embodiment of the present invention.

First, a drift time may be defined as the time that is required for the resistance value of a memory cell existing in the set state (SET) to increase to a read resistance value equal to the read resistance Rrd from the time when a write operation is performed on the memory cell, and be a time corresponding to a drift phenomenon 203. The drift time may be a time that is required for the state distribution D1 to move to a state distribution D4 such that the right edge of the state distribution D4 abuts the read resistance value Rrd. The drift time may be calculated through a test in which set data is written in the memory region 210 and then a read operation is repeated until reset data is read. Summarizing these, set data should be rewritten within the drift time to recover a stable resistance value, so as not to be read as an error bit.

A critical time CT may be a time that is obtained through dividing the drift time by the number n of the memory units UNIT1 to UNITn of the memory region 210. As will be described later in detail, the wear leveling unit 110 may perform wear leveling operations by rewriting sequentially the data stored in the respective memory units UNIT1 to UNITn, at different positions at the latest within the critical time CT. As a result, because all data which are written in the memory region 210 are rewritten at least once within the drift time, the data will not be changed to an error bit.

Figure 4:
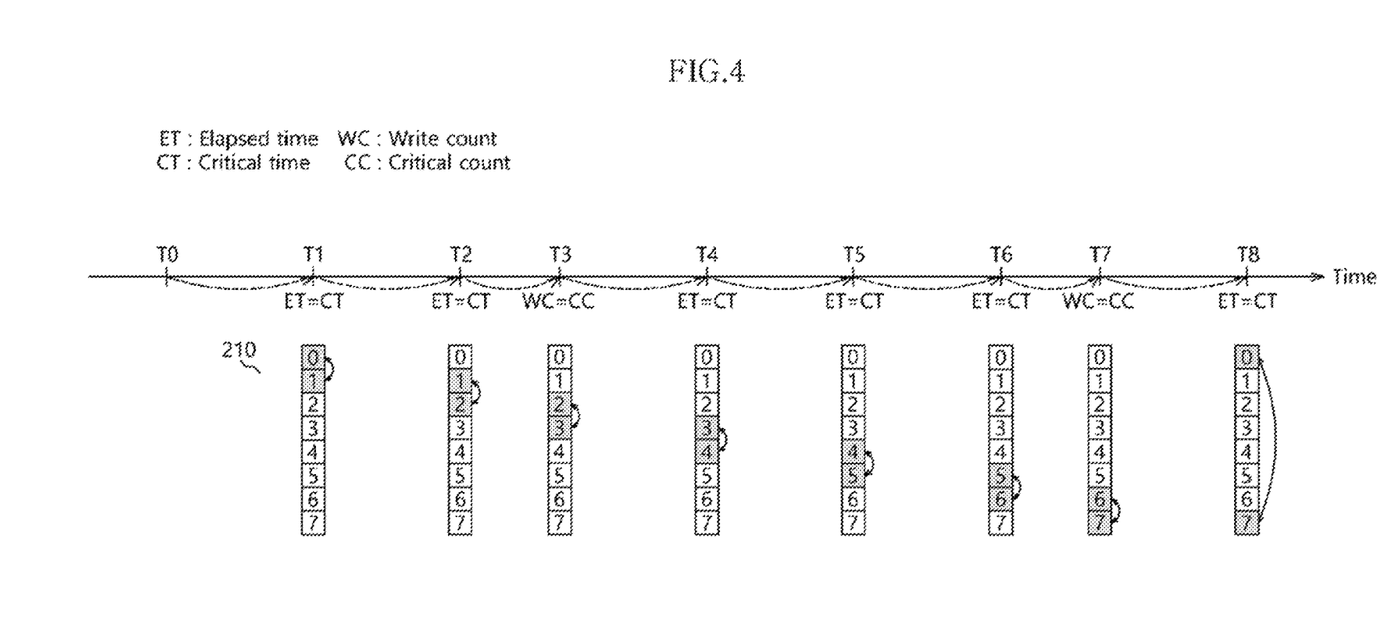
FIG. 4 is a diagram illustrating an example of an operation of a wear leveling unit employed in the data storage device of FIG. 1.

FIG. 4 is a diagram illustrating an example of a wear leveling operation of the wear leveling unit 110 of FIG. 1. For the sake of convenience in explanation, FIG. 4 illustrates that the memory region 210 may include eight memory units corresponding to addresses "0" to "7."

The wear leveling unit 110 may determine whether an elapsed time ET which is measured by the timer 111 reaches a critical time CT. The wearing leveling unit 110 may also determine whether a write count WC of the memory region 210 reaches a critical count CC. The wearing leveling unit 110 may perform a wear leveling operation for the memory units selected among the memory units of the memory region 210, only either when it is determined that the elapsed time ET of the timer 111 has reached the critical time CT or when it is determined that the write count WC of the memory region 210 has reached the critical count CC. Hence, a wear leveling operation for the memory units selected among the memory units of the memory region 210, is performed at the latest within the critical time CT. After a wear leveling operation for the memory units selected among the memory units of the memory region 210 is performed, the elapsed time ET of the timer 111 and the write count WC of the write counter 112 are reset and begin to be measured again.

In FIG. 4, two memory units for which a wear leveling operation is to be performed may be selected according to a swap algorithm. The wear leveling unit 110 may select a first memory unit sequentially among the memory units, at each time of performing a wear leveling operation. For example, the wear leveling unit 110 may select the first memory unit sequentially among the memory units of a memory region 210, by increasing an address, at each time of performing a wear leveling operation. The wear leveling unit 110 may select a memory unit having an address next to the first memory unit, as a second memory unit, at each time of performing a wear leveling operation. The wear leveling unit 110 may exchange and store the data stored in the first memory unit and the data stored in the second memory unit. Accordingly, the first and second memory units may be accessed evenly. According to an embodiment, the second memory unit may not be a memory unit having an address next to the first memory unit but another memory unit selected according to a prescribed rule.

Referring to FIG. 4, at a time T0, the timer 111 and the write counter 112 of the wear leveling unit 110 may begin to measure the elapsed time ET and the write count WC, respectively.

At a time T1, when it is determined that the elapsed time ET from the time T0 has reached the critical time CT, the wear leveling unit 110 may perform a wear leveling operation by exchanging and storing the data stored in the first and second memory units, according to the swap algorithm described above. For example, the wear leveling unit 110 may exchange and store the data stored in the memory units having the addresses "0" and "1." In addition, upon completion of the wear leveling operation for the memory units having the addresses "0" and "1", the controller resets the elapsed time and the write count.

At a time T2, when it is determined that the elapsed time ET from the time T1 has reached the critical time CT, the wear leveling unit 110 may perform a wear leveling operation by exchanging and storing the data stored in the memory units having the addresses "1" and "2" according to the swap algorithm. In addition, upon completion of the wear leveling operation for the memory units having the addresses "1" and "2", the controller resets the elapsed time and the write count.

At a time T3, when it is determined that the write count WC of the memory region 210 counted from the time T2 has reached the critical count CC, the wear leveling unit 110 may perform a wear leveling operation by exchanging and storing the data stored in the memory units having the addresses "2" and "3" according to the swap algorithm. In addition, upon completion of the wear leveling operation for the memory units having the addresses "2" and "3", the controller resets the elapsed time and the write count.

At a time T4, when it is determined that the elapsed time ET from the time T3 has reached the critical time CT, the wear leveling unit 110 may perform a wear leveling operation by exchanging and storing the data stored in the memory units having the addresses "3" and "4" according to the swap algorithm. In addition, upon completion of the wear leveling operation for the memory units having the addresses "3" and "4", the controller resets the elapsed time and the write count.

At a time T5, when it is determined that the elapsed time ET from the time T4 has reached the critical time CT, the wear leveling unit 110 may perform a wear leveling operation by exchanging and storing the data stored in the memory units having the addresses "4" and "5" according to the swap algorithm. In addition, upon completion of the wear leveling operation for the memory units having the addresses "4" and "5", the controller resets the elapsed time and the write count.

At a time T6, when it is determined that the elapsed time ET from the time T5 has reached the critical time CT, the wear leveling unit 110 may perform a wear leveling operation by exchanging and storing the data stored in the memory units having the addresses "5" and "6" according to the swap algorithm. In addition, upon completion of the wear leveling operation for the memory units having the addresses "5" and "6", the controller resets the elapsed time and the write count.

At a time T7, when it is determined that the write count WC of the memory region 210 counted from the time T6 has reached the critical count CC, the wear leveling unit 110 may perform a wear leveling operation by exchanging and storing the data stored in the memory units having the addresses "6" and "7" according to the swap algorithm. In addition, upon completion of the wear leveling operation for the memory units having the addresses "6" and "7", the controller resets the elapsed time and the write count.

At a time T8, when it is determined that the elapsed time ET from the time T7 has reached the critical time CT, the wear leveling unit 110 may perform a wear leveling operation by exchanging and storing the data stored in the memory units having the addresses "7" and "0" according to the swap algorithm. In addition, upon completion of the wear leveling operation for the memory units having the addresses "7" and "0", the controller resets the elapsed time and the write count.

After the time T8, the wear leveling unit 110 may repeat the operations illustrated in FIG. 4. By selecting the critical time to be equal to the drift time divided by the number of all the memory units of a memory region, and by ensuring that a wear leveling operation for each selected memory unit is performed within a time period that is less than the critical time, it is ensured that all the data which are stored in the memory units of the memory region 210 are rewritten at least once within a time period that is less than the drift time for the memory region. This way occurrence of an error bit due to the drift phenomenon may be prevented. Moreover, since such a refresh effect is achieved through wear leveling operations, the service lifetime of the memory region 210 may be extended.

Figure 5:
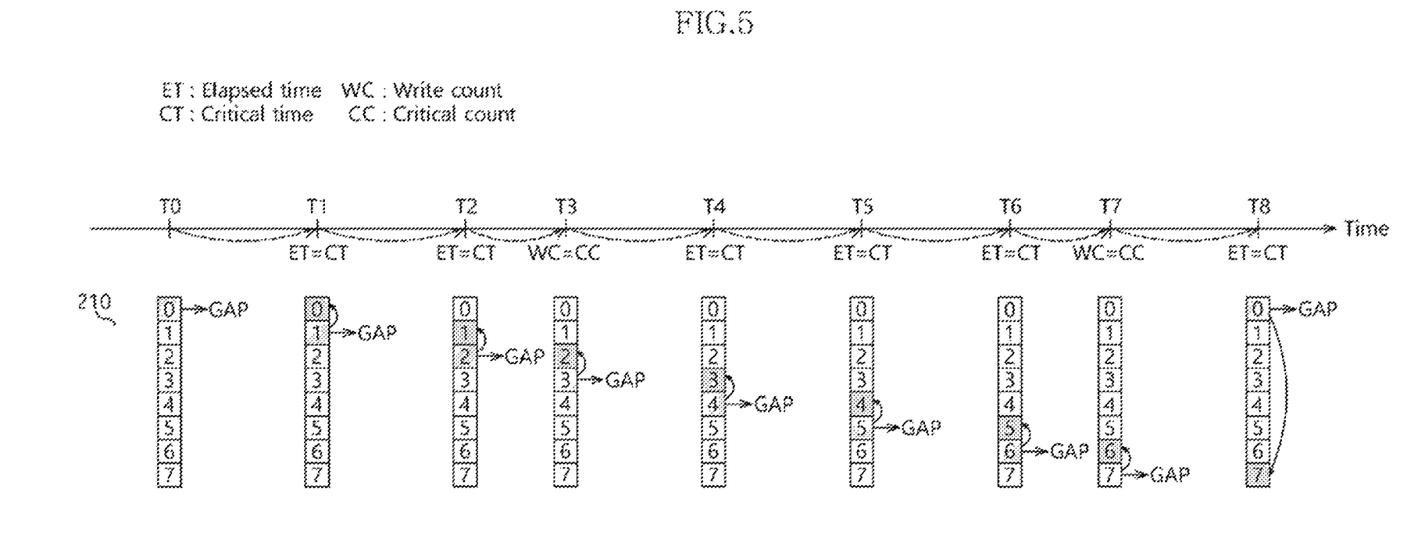
FIG. 5 is a diagram illustrating another example of an operation of the wear leveling unit employed in the data storage device of FIG. 1.

FIG. 5 is a diagram illustrating another example of the operation of the wear leveling unit 110 shown in FIG. 1. In the example of FIG. 5, unlike the wear leveling operation of FIG. 4 which employs a swap algorithm, a wear leveling operation may be performed which employs a gap algorithm.

In the gap algorithm, two memory units for which a wear leveling operation is to be performed are sequentially selected. That is, a memory unit to be designated as a gap and a memory unit previously designated as a gap may be selected. The wear leveling unit 110 may select a memory unit to be designated as a gap, sequentially among the memory units, for example, by increasing an address, at each time of performing a wear leveling operation. For example, the wear leveling unit 110 may select a memory unit to be designated as a gap, sequentially among the memory units of the memory region 210, by increasing an address, at each time of performing a wear leveling operation. When a memory unit is designated as a gap it cannot be used to store data. The wear leveling unit 110 may copy the data which may already be stored in a memory unit to be designated as a gap, to the memory unit previously designated as a gap at each time of performing a wear leveling operation. In other words, the wear leveling unit 110 may change a gap by increasing an address, at each time of performing a wear leveling operation. As a result, the memory units of the memory region 210 may be accessed evenly.

For example at a time T0, the memory unit having the address "0" may be designated as a gap. At a time T1, when it is determined that the elapsed time ET from the time T0 has reached the critical time CT, the wear leveling unit 110 may copy the data stored in the memory unit having the address "1" to the memory unit having the address "0" to newly designate the memory unit having the address "1" as a gap according to the gap algorithm.

In the same manner as described above with reference to FIG. 4, in FIG. 5, a wear leveling operation may be performed each time when it is determined that the elapsed time ET of the timer 111 has reached the critical time CT or it is determined that the write count WC of the write counter 112 for the memory region 210 has reached the critical count CC whichever event occurs first. After a wear leveling operation is performed, the elapsed time ET of the timer 111 and the write count WC of the write counter 112 may be reset. Therefore, detailed description will be omitted herein.

Figure 6:
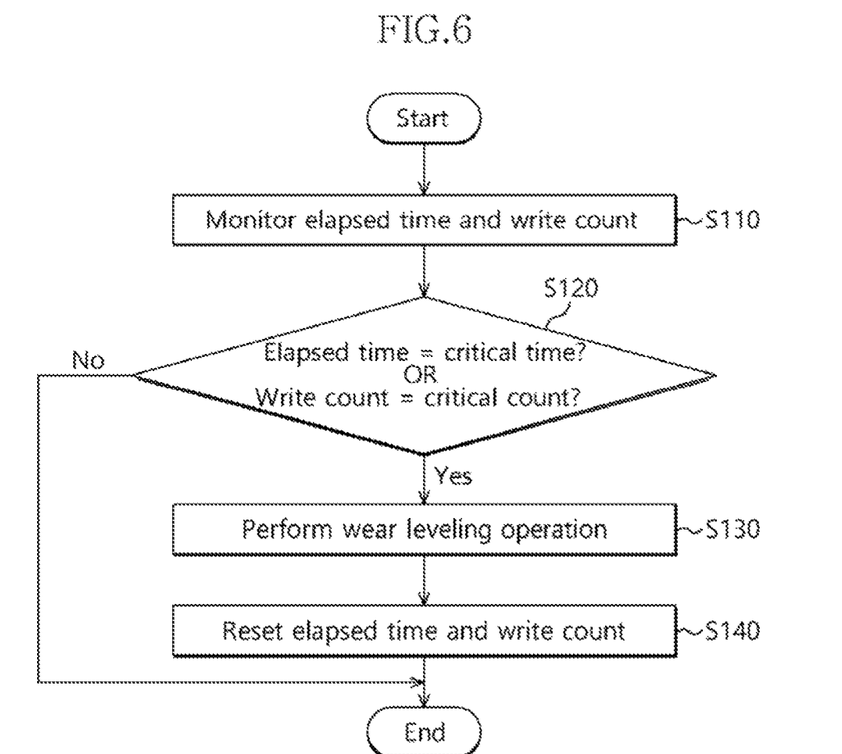
FIG. 6 is a flow chart of a method for operating the data storage device of FIG. 1.

FIG. 6 is a flow chart of a method for operating the data storage device 10 of FIG. 1. FIG. 6 shows a method for the wear leveling unit 110 to perform a wear leveling operation for the memory region 210. The process shown in FIG. 6 may be performed repeatedly while the data storage device 10 operates.

Referring to FIG. 6, at step S110, the wear leveling unit 110 may monitor the elapsed time of the timer 111 and the write count counted for the memory region 210 by the write counter 112.

At step S120, the wearing leveling unit 110 may determine whether the elapsed time of the timer 111 has reached a critical time or whether the write count of the memory region 210 has reached a critical count. In an embodiment, the critical time may be a time that is obtained through dividing a drift time for the memory region 210 by the number n of the entire memory units UNIT1 to UNITn of the memory region 210. When the elapsed time of the timer 111 has not reached the critical time and the write count of the memory region 210 has not reached the critical count, the process may be ended. When the elapsed time of the timer 111 has reached the critical time or the write count of the memory region 210 has reached the critical count (S120, Yes), the process may proceed to step S130.

At the step S130, the wear leveling unit 10 may perform a wear leveling operation for the memory units selected in the memory region 210. Memory units for which a wear leveling operation is to be performed may be selected sequentially and evenly according to a swap algorithm or a gap algorithm.

At step S140, the timer ln may reset the measured passed time, and the write counter 112 may reset the counted write count. The timer 111 and the write counter 112 may then begin to measure again an elapsed time and a write count.

While the invention has been described in terms of various specific embodiments, it will be understood to those skilled in the art to which the present invention pertains that the embodiments described herein are examples only. Accordingly, the data storage device and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. A data storage device comprising:
    a nonvolatile memory device including a memory region, the memory region including a plurality of memory units; and
    a controller suitable for monitoring an elapsed time and a write count of the memory region, and performing a wear leveling operation for at least one memory unit selected among the plurality of memory units depending on a monitoring result,
    wherein the controller performs the wear leveling operation by comparing the elapsed time with a critical time which is set based on a drift time of the memory region, and
    wherein the drift time is time required for a resistance value of a memory cell existing in a set state to increase to a resistance value of a memory cell in a reset state from the time when a write operation is performed on the memory cell.

2. The data storage device according to claim 1, wherein the controller performs the wear leveling operation when the elapsed time reaches the critical time or when the write count reaches a critical count.

3. The data storage device according to claim 1, wherein the controller resets the elapsed time and the write count after performing the wear leveling operation, and begins to measure again an elapsed time and a write count.

4. The data storage device according to claim 1, wherein the controller performs the wear leveling operation by exchanging and storing data stored in a first memory unit and data stored in a second memory unit, which are selected sequentially among the plurality of memory units.

5. The data storage device according to claim 1, wherein the controller performs the wear leveling operation by storing data stored in a memory unit selected sequentially among the plurality of memory units, in a memory unit previously designated as a gap, and designating the selected memory unit as a new gap.

6. The data storage device according to claim 1, wherein the critical time is a time that is obtained through dividing the drift time by the number of the memory units.

7. A method for operating a data storage device, comprising:
    monitoring an elapsed time and a write count of a memory region including a plurality of memory units; and
    performing a wear leveling operation for at least one memory unit selected among the plurality of memory units by comparing the elapsed time with a critical time which is set based on a drift time of the memory region,
    wherein the drift time is time required for a resistance value of a memory cell existing in a set state to increase to a resistance value of a memory cell in a reset state from the time when a write operation is performed on the memory cell.

8. The method according to claim 7, wherein the performing of the wear leveling operation comprises:
    performing the wear leveling operation when the elapsed time reaches the critical time or when the write count reaches a critical count.

9. The method according to claim 7, further comprising:
    resetting the elapsed time and the write count after performing the wear leveling operation, and beginning to measure again an elapsed time and a write count.

10. The method according to claim 7, wherein the performing of the wear leveling operation comprises:
    exchanging and storing data stored in a first memory unit and data stored in a second memory unit, which are selected sequentially among the plurality of memory units.

11. The method according to claim 7, wherein the performing of the wear leveling operation comprises:
    storing data stored in a memory unit selected sequentially among the plurality of memory units, in a memory unit previously designated as a gap; and
    designating the selected memory unit as a new gap.

12. The method according to claim 7, wherein the critical time is a time that is obtained through dividing the drift time by the number of the memory units.

13. A data storage device comprising:
    a nonvolatile memory device including a memory region which includes a plurality of memory units; and
    a controller suitable for performing a wear leveling operation for the memory region with a cycle of a critical write count,
    wherein the controller performs the wear leveling operation at latest within a critical time,
    wherein the critical time is set based on a drift time of the memory region, and
    wherein the drift time is time required for a resistance value of a memory cell existing in a set state to increase to a resistance value of a memory cell in a reset state from the time when a write operation is performed on the memory cell.

14. The data storage device according to claim 13, wherein the critical time is a time that is obtained through dividing the drift time by the number of the plurality of memory units.

15. The data storage device according to claim 13, wherein the controller performs the wear leveling operation by exchanging and storing data stored in a first memoryunit and data stored in a second memory unit, which are selected sequentially among the plurality of memory units.

16. The data storage device according to claim 13, wherein the controller performs the wear leveling operation by storing data stored in a memory unit selected sequentially among the memory units, in a memory unit previously designated as a gap, and designating the selected memory unit as a new gap.

\* \* \* \* \*